United States Patent [19]

Brooks et al.

[11] 4,054,593
[45] Oct. 18, 1977

[54] NITROGEN-CONTAINING COMPOUNDS

[75] Inventors: John Langshaw Brooks; Richard Budziarek, both of Manchester, England

[73] Assignee: Imperial Chemical Industries Limited, Great Britain

[21] Appl. No.: 656,587

[22] Filed: Feb. 9, 1976

[30] Foreign Application Priority Data

Mar. 10, 1975   United Kingdom ............... 9844/75

[51] Int. Cl.$^2$ ................... C07C 79/46; C07C 101/00
[52] U.S. Cl. .................................. 560/12; 156/314;
156/331; 260/77.5 B; 260/77.5 BB; 427/407 C;
427/407 G; 427/409; 428/424; 428/425;
560/148; 560/137
[58] Field of Search ............... 156/331, 308, 314, 310,
156/325, 326, 307, 315, 110 A; 427/407 C, 407
G, 409; 428/424, 425; 260/77.5 B, 77.5 BB,
470, 481 C, 42.38, 463, 471 C

[56] References Cited

U.S. PATENT DOCUMENTS

| 2,787,630 | 4/1957 | Katz et al. | 260/77.5 B |
|---|---|---|---|
| 2,835,654 | 5/1958 | Carter et al. | 260/77.5 B |
| 2,888,440 | 5/1959 | Frazer et al. | 260/77.5 B |
| 2,929,802 | 3/1960 | Katz | 260/77.5 B |
| 3,051,686 | 8/1962 | Bissinger | 260/77.5 B |
| 3,084,140 | 4/1963 | Gurgiolo et al. | 260/77.5 B |
| 3,334,128 | 8/1967 | Brown | 260/77.5 B |
| 3,491,050 | 1/1970 | Keberle et al. | 156/331 |
| 3,657,047 | 4/1972 | Breslow | 156/331 |

OTHER PUBLICATIONS

Baker, "Hydroxylamine and Hydroxylamine Salts", Kirk–Othmer ECT, vol. 11.

Primary Examiner—Charles E. Van Horn
Assistant Examiner—J. J. Gallagher
Attorney, Agent, or Firm—Cushman, Darby & Cushman

[57] ABSTRACT

Poly-sulphonyloxyurethanes of the formula

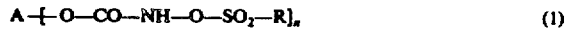

$$A\text{---}[O\text{---}CO\text{---}NH\text{---}O\text{---}SO_2\text{---}R]_n \quad (1)$$

wherein A is a linking group to which the oxygen atoms are attached at alkyl, cycloalkyl or aryl carbon atoms, $n$ is an integer of value at least 2, and each R which may be the same or different, is an optionally substituted alkyl or aryl group, and their salts, especially salts with cations based on tertiary amines, are useful cross-linking or chain-extending agents for natural or synthetic polymers, or may be used as adhesives for binding these materials to each other or to metal substrates.

7 Claims, No Drawings

NITROGEN-CONTAINING COMPOUNDS

This invention relates to nitrogen-containing compounds and more particularly to poly-sulphonyloxyurethanes and their salts, and to their use as cross-linking and bonding agents for polymers.

According to the invention there are provided poly-sulphonyloxyurethanes of the formula:

$$A + O-CO-NH-O-SO_2-R]_n \quad (1)$$

wherein A is a linking group to which the oxygen atoms are attached at alkyl, cycloalkyl or aryl carbon atoms, $n$ is an integer of value at least 2, and each R which may be the same or different, is an optionally substituted alkyl or aryl group.

The invention also provides salts of these poly-sulphonyloxyurethanes of the formula:

$$A + O-CO-\overline{N}-O-SO_2-R]_n (B^{m+})_{n/m} \quad (2)$$

where B is a cation of valency $m$.

As linking groups represented by A there may be mentioned alkylene groups such as ethylene, 1,2- and 1,3-propylene, tetramethylene, hexamethylene, octamethylene, decamethylene, and dodecamethylene; cycloalkylene such as 1,4-cyclohexylene; arylene such as m- and p- phenylene; alkarylene groups derived from combinations of the foregoing groups such as methylene-bis-4-phenyl, 2,2-propylene-bis-4-phenyl-, m- and p-xylylene; groups derived from one or more of the foregoing groups linked by heteroatoms or groups containing heteroatoms, e.g. bis-(alkyleneoxy)phenylene groups; or radicals derived from polyalkylene oxides such as polyethylene oxides, condensates of alkylene oxides with glycols and other compounds containing two or more hydroxyl groups such as glycerol, 1,4-bis-(β-hydroxyethoxycarbonyl)benzene, mannitol, sorbitol and sucrose; unsaturated polyvalent groupings e.g. as derived from pentaerythritol dialkyl ether, and polymeric chains to which the oxycarbonyl groups are attached directly or through pendant groups, as for example in addition polymers and copolymers of alkyl esters of acrylic or methacrylic acids in which the oxycarbonyl group is attached to the alkyl radical of the ester group.

As optionally substituted alkyl or aryl groups which may be represented by R, there may be mentioned alkyl groups preferably containing from 1 to 4 carbon atoms such as ethyl, n- and iso-propyl, n-butyl, and especially methyl, but also n-octyl, n-decyl, n-dodecyl and n-octadecyl, and substituted derivatives of these such as chloroethyl, trifluoromethyl and perfluorooctyl, and aryl groups such as phenyl and o-, m- and p-tolyl and substituted aryl especially substituted phenyl groups such as nitrophenyl, chloro-, bromo-, iodo- and fluorophenyl and alkoxyphenyl, e.g. methoxyphenyl.

The preferred meaning for the radical A is the group consisting of alkylene radicals of the formula $(CH_2)_m$ where $m$ has a value of 2 to 10, or bis-(ethyleneoxy)phenylene radicals of the formula

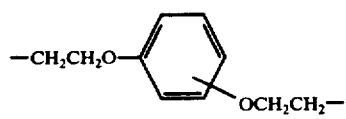

or polyalkyleneoxy radicals of the formula:

$$-CH_2CH_2(OCH_2CH_2)_p$$

where $p$ has a value 1 or 2.

The preferred meaning for the radical R is the group consisting of methyl, phenyl, tolyl and nitrophenyl.

Thus, as preferred examples of formula (1) there may be mentioned:

1,4-bis[N-(p-nitrobenzenesulphonyloxy)carbamoyloxy]butane alternatively named as butane-1,4-bis-(p-nitrobenzenesulphonyloxy)urethane, 1,4-bis-[N-(m-nitrobenzenesulphonyloxy)carbamoyloxy]butane, 1,4-bis-[N-(benzenesulphonyloxy)carbamoyloxy]butane, 1,4-bis-[N-(p-toluenesulphonyloxy)carbamoyloxy]butane, 1,4-bis-[N-(methanesulphonyloxy)carbamoyloxy]butane, 1,4-bis-[N-(benzenesulphonyloxy)carbamoyloxyethoxy]benzene, 1,2-bis-[N-(m-nitrobenzenesulphonyloxy)carbamoyloxy]ethane, β,β'-bis-[N-(m-nitrobenzenesulphonyloxy)carbamoyloxy]ethyl ether, 1,2-bis-[N-(m-nitrobenzenesulphonyloxy)carbamoyloxyethoxy]ethane, 1,6-bis-[-(m-nitrobenzenesulphonyloxy)carbamoyloxy]hexane, 1,10-bis-[N-(m-nitrobenzenesulphonyloxy)carbamoyloxy]dodecane.

The value of $n$ is preferably 2.

As examples of cations represented by B, there may be mentioned alkali metal cations, e.g. sodium and potassium; however these salts tend to decompose at the usual ambient temperatures and it is preferred that B should represent an organic cation, derived from primary, secondary and especially tertiary amines, e.g. thiouronium or diethylammonium, but preferably trialkylammonium salts as derived e.g. from tertiary amines such as triethylamine, dimethylbenzylamine, triethanolamine, pyridine, 1,4-diazabicyclo-2,2,2-octane, or other tertiary amino compounds such as tetraalkylthioureas, tetraalkyl-thiuram mono- and disulphides, and dialkyldithiocarbamates, especially zinc dialkyldithiocarbamate and benzthiazyl derivatives. As a general rule, it is preferred that the cation should be derived from an amino compound of low volatility at ambient temperatures, since these are more stable than either the alkali metal salts or the salts formed by volatile amino compounds. All the salts are thermally unstable, the instability being increased by the presence of electron withdrawing substituents, e.g. halogen atoms or nitro groups in the group R.

The invention also provides a process for manufacture of the poly-sulphonyloxyurethanes of formula (1) which comprises reacting a poly-(hydroxyurethane) of the formula:

$$A + O-CO-NHOH]_n \quad (3)$$

with $n$ moles of a sulphonyl chloride of the formula:

$$R-SO_2Cl \quad (4)$$

the symbols A, R and n having the meanings stated above, in the presence of an acid-binding agent which is added at a rate sufficient to neutralise the mineral acid formed whilst keeping the pH of the mixture below 7.

The above process can conveniently be carried out by mixing the poly-(hydroxyurethane) and the sulphonyl chloride in an inert solvent, e.g. diethyl ether or dioxan, and adding the acid-binding agent at such a rate that the pH of the mixture is maintained at below 7. The reaction is preferably carried out at a temperature below 10° C, more especially from 0° C to 5° C.

Excess of the sulphonyl chloride should be avoided, since otherwise a further reaction may take place whereby sulphon-acylation of the imino group is effected. This reaction can also take place in preference to reaction with the hydroxyl group if the pH of the mixture is allowed to rise to 7 or above.

As examples of acid-binding agents which can be used in the above process there may be mentiond alkali metal carbonates, bicarbonates and hydroxides, but more especially tertiary amines e.g. trialkylamines, tris-(hydroxyalkyl)amines, pyridine or its homologues. As particular examples of all these, there may be mentioned:

sodium and potassium bicarbonated, carbonates and hydroxides
triethyl- and tri-n-butyl amines
triethanolamine
1,4-diaza-2,2,2-bicyclooctane
N-methylpiperidine
quinoline and the picolines.

As examples of sulphonyl chlorides of formula (4) which may be used in the above process, there may be mentioned:

methane sulphonyl chloride
benzene sulfonyl chloride
p-tolyl sulphonyl chloride m- and p-nitrobenzene sulphonyl chlorides, and
$\alpha$ or $\beta$-naphthalene sulphonyl chloride.

The poly-(hydroxyurethanes) of formula (3) used in the above process can be obtained by reacting a polyol of the formula $A(OH)_n$ with excess phosgene to form a poly-chloroformate of the formula $A(O-CO-Cl)_n$ and reacting the latter with hydroxylamine.

As examples of polyols of formula $A(OH)_n$ which may be used, there may be mentioned: aliphatic glycols and higher polyols, e.g.

ethylene glycol
1,2- and 1,3-propylene glycols
1,4-, 1,3- and 2,3-butylene glycols
hexamethylene and decamethylene glycols
glycerol
trimethylolethane
trimethylolpropane
pentaerythritol
araliphatic glycols e.g.
m- or p-xylylene glycols
di-($\beta$-hydroxyethyl)hydroquinone;

polyethers formed by the addition of alkylene oxides of 2-4 carbon atoms, e.g. ethylene oxide, propylene oxide or tetrahydrofuran, on aliphatic or araliphatic polyols as described above, or on aromatic polyols e.g. hydroquinone, catechol, resorcinol or carbohydrate polyols, e.g. glucose, fructose, sorbitol, mannitol, sucrose; polyesters formed by the esterification of di- or poly-carboxylic acids e.g. adipic or phthalic acid, with aliphatic glycols or higher polyols of the kinds described above, especially $\beta$-hydroxyethyl terephthalates; hydroxyl-ended polyolefines e.g. polyethylene or polypropylene containing terminal OH groups, addition polymers of ethylene compounds containing a hydroxyl group, e.g. polyvinyl alcohol, poly-$\beta$-hydroxyethyl acrylate or poly-$\beta$-hydroxyethylmethacrylate.

The poly-sulphonyloxyurethanes of the invention are oils or solids, depending on the values of A, R and $n$, soluble in many organic solvents. They may be converted to the salts of formula (2) by treatment with a suitable basic compound, containing the cation B+.

The poly-sulphonyloxyurethane salts of the invention may be used as cross-linking agents for polymers, as chain extending agents for e.g. polyepoxides and other polyfunctional compounds, as bonding agents and adhesives for use with polymers or other materials, and as coating agents. As polymers which may be cross-linked there may be mentioned natural rubber, synthetic rubbers such as styrene-butadiene (SBR), acrylonitrile-butadiene, ethylene-propylene rubbers (EPDM), stereo-regular polyisoprene, high or low density polyethylene, polypropylene, nylons, polyesters and polyurethanes. Any of the above polymers for example styrene-butadiene rubber may be bonded to the same polymer, or a different polymer as for example stereo-regular polyisoprene, or to other materials such as polyethylene terephthalate, nylon-6, nylon-6,6, rayon and metal substrates such as copper, brass and steel, by means of the poly-sulphonyloxyurethane salts of the invention.

The poly-sulphonyloxyurethane salts may be incorporated into the polymer by for example blending with the polymer in any conventional manner, such as on a two-roll mill, this type of procedure being especially suitable when the poly-sulphonyloxyurethane salt is to be used as a cross-linking agent and must be present throughout the bulk of the polymer. The polymer is thereafter shaped, for example in a mould, and heated to a temperature above 50° C, and preferably between 100° C and 250° C, to bring about cross-linking. The salt may be pre-formed and added to the polymer or may be formed in situ by adding a poly-sulphonyloxyurethane of formula (1) and at least an equivalent weight of a basic compound providing the cation B+.

For use as a bonding agent or adhesive, in which cases application of the poly-sulphonyloxyurethane salt is usually necessary only at the surfaces of the polymer, it is generally more convenient and economical to treat the polymer in shaped form, e.g. in filament, yarn, fabric, sheet or massive form, with the poly-sulphonyloxyurethane and basic compound in solution form, and then heat the treated polymer to drive off the solvent, bring the surfaces to be bonded, e.g. polyester cord and rubber, into contact, and then heat more strongly to effect bonding. An auxiliary bonding agent such as an epoxy resin and resorcinol/formaldehyde reaction product may also be present to aid adhesion.

As basic compounds which may be used in conjunction with the poly-sulphonyloxyurethanes in polymers there may be mentioned any of the basic compounds used to form salts of the poly-sulphonyloxyurethanes. Volatile amines may have the disadvantage of causing porosity in polymers treated in the mass, and non-volatile amino compounds are more suitable for this purpose. Certain amines, such as tetramethylthiourea or the tetramethylthiuram monosulphides and disulphides and various dialkyldithiocarbamates, which are commonly used as vulcanisation accelerators may be more suitable for this purpose, especially for use in rubber.

It is most convenient to add the poly-sulphonyloxyurethane and basic compound independently to the polymer but similar effects may be obtained by mixing the poly-sulphonyloxyurethane and basic compound together before addition or to react them to form the salt. The last two procedures however may have the disadvantage that the mixture or the salt may not be stable to storage.

The amount of basic compound is suitably equimolar to that of the sulphonyloxyurethane groups present in the poly-sulphonyloxyurethane added, but less or more may be used if desired.

The uses of the poly-sulphonyloxyurethanes described above and polymers so treated represent further features of the invention.

The invention is illustrated but not limited by the following Examples in which all parts and percentages are by weight unless otherwise stated.

EXAMPLE 1

A solution of 360 parts of 1,4-butanediol in 200 parts of chloroform is added over 2 hours to a stirred solution of 900 parts of phosgene in 500 parts of methylene dichloride at a temperature of 0° C under a reflux condenser cooled with solid carbon dioxide. The reaction mixture is then stirred at 5° C for 1 hour and at 25° C for 3 hours after which the condenser is removed and a stream of dry nitrogen is passed to remove hydrogen chloride and excess phosgene. The methylene dichloride and chloroform are distilled off under reduced pressure and 850 parts of 1,4-butane bis-chloroformate are obtained by distillation at 97° C under a pressure of 1 mm of mercury. On analysis the compound was found to contain carbon 34.1%, hydrogen 4.1% and chlorine 32.7%, the theoretical figures being carbon 33.5%, hydrogen 3.7% and chlorine 33.0%.

A solution of 276.4 parts of potassium carbonate in 250 parts of water and 215 parts of 1,4-butane bis-chloroformate are added separately at equivalent rates over 1 hour to a stirred suspension of 139 parts of finely ground hydroxylamine hydrochloride in 700 parts of diethyl ether at a temperature between 0° and 5° C. After a further 3 hours stirring at 0° C and 18 hours at 25° C the suspension is filtered and the filter cake washed with water until free from chloride. 170 parts of butane-1,4-bis-N-hydroxycarbamate, a white solid melting at 150° C, are obtained. On analysis the compound was found to contain carbon 35.5%, hydrogen 5.9% and nitrogen 13.0%, the theoretical figures being carbon 34.6%, hydrogen 5.8% and nitrogen 13.5%.

A mixture of 20.8 parts of butane-1,4-bis-N-hydroxycarbamate, 44.4 parts of p-nitrobenzenesulphonyl chloride and 250 parts of dioxan is stirred at a temperature of 0°–5° C while a solution of 18.4 parts of triethylamine in 50 parts of dioxan is added over about 1 hour at such a rate that the pH is maintained between 3 and 6. After a further 12 hours stirring at a temperature of 25° C the mixture is added to 1500 parts of 4% aqueous sodium chloride solution. The oily product is separated in 500 parts of chloroform which is washed with water, dried and evaporated under reduced pressure at 40° C. The residue is washed with toluene and dried under reduced pressure to give 26 parts of butane-1,4-bis(p-nitrophenylsulphonoxyurethane), a yellowish solid melting at 105° C. On analysis the product was found to contain carbon 36.7%, hydrogen 3.0%, nitrogen 9.7% and sulphur 11.0%, the theoretical figures being carbon 37.4%, hydrogen 3.1%, nitrogen 9.7% and sulphur 11.1%.

EXAMPLE 2

4 parts of butane-1,4-bis(p-nitrophenylsulphonoxyurethane) and 2 parts of tetramethylthiourea were milled in succession into 100 parts of a 27:73 styrene-butadiene copolymer (SBR) at 50°–60° C to give a pale yellow sheet. The compounded rubber sheet was cured at 190° C for 10 minutes to give a cross-linked rubber in which the extension at break was 600%. The styrene-butadiene copolymer cured without the additives has an extension at break of 130%.

Similar results were obtained when the tetramethylthiourea was replaced by 3 parts of tetramethylthiuram monosulphide or zinc diethyl-dithiocarbamate. The maximum modulus torque recorded by Oscillating Disc Rheometer was 48, 43 and 46 units respectively, vs. 17 for the untreated rubber after 54 minutes cure. Similar treatment of ethylene-propylene copolymer using tetramethylthiuram mono-sulphide gave a maximum torque modulus 57 vs. "no cure" for the untreated rubber.

EXAMPLE 3

Repetition of the final stage of Example 1 using m-nitrobenzenesulphonyl chloride instead of p-nitrobenzenesulphonyl chloride afforded butane-1,4-bis(m-nitrophenylsulphonoxyurethane), a viscous oil. On analysis the product was found to contain carbon 41.2%, hydrogen 3.9%, nitrogen 9.6% and sulphur 11.2%, the theoretical figures being carbon 39.4%, hydrogen 3.1%, nitrogen 9.7% and sulphur 11.1%.

EXAMPLE 4

Repetition of the procedure of Example 2 using tetramethylthiourea and butane-1,4-bis(m-nitrophenylsulphonoxyurethane) instead of the p-nitro isomer afforded a cross-linked rubber in which the extension at break had been increased by approximately 600%, i.e. 130% for untreated SBR to 900%. Using zinc diethyl dithiocarbamate in place of tetramethylthiourea gave a peak torque 32 after 4 minutes at 180° C, vs. "no cure" for the untreated sample.

EXAMPLE 5

Repetition of the final stage of Example 1 using 35.3 parts of benzene sulphonyl chloride instead of p-nitrobenzenesulphonyl chloride gives butane-1,4-bis(-phenylsulphonyloxyurethane), a colourless viscous oil. On analysis the product was found to contain carbon 45.0%, hydrogen 4.3%, nitrogen 5.0% and sulphur 15.3%, the theoretical values being carbon 44.3%, hydrogen 4.1%, nitrogen 5.7% and sulphur 13.1%.

EXAMPLE 6

Repetition of the procedure of Example 2 using tetramethylthiourea and butane-1,4-bis(phenylsulphonyloxyurethane) afforded a cross-linked rubber in which the extension at break was 900%, an increase of 600% over the untreated rubber. Using zinc diethyl dithiocarbamate at 180° C gave a product with peak torque of 28 after 1.5 minutes.

A similar result is obtained if the butane-1,4-bis (phenylsulphonyloxyurethane) and tetramethylthiourea are ground together with cooling and the mixture is milled into 100 parts of styrene-butadiene rubber at 50°–60° C, and the latter is then cured at 190° C for 10 minutes.

EXAMPLE 7

Repetition of the final stage of Example 1 using 38.2 parts of p-toluene sulphonyl chloride in place of the p-nitrobenzene sulphonyl chloride affords butane-1,4-bis(p-toluenesulphonyloxyurethane) as a white solid, m.p. 122° C. On analysis the product was found to contain carbon 45.9%, hydrogen 4.8%, nitrogen 5.3% and sulphur 12.4%, the theoretical values being carbon 46.5%, hydrogen 4.6%, nitrogen 5.4% and sulphur 12.4%.

EXAMPLE 8

Repetition of Example 2, using butane-1,4-bis(p-toluene sulphonyloxyurethane) and tetramethylthiourea gave a cross-linked product having an extension of break 600% greater than the original. A product having a peak torque of 25 was obtained after 2.5 minutes at 180° C using zinc diethyl dithiocarbamate.

EXAMPLE 9

Rubber master batches based on Natural Rubber (NR) and Styrene/Butadiene Rubber (SBR), as detailed below, are prepared by mixing the ingredients together in a BR size Banbury mixer.

|  | MB/1 | MB/2 |
|---|---|---|
| Natural Rubber (SMR 5) | 100 | — |
| Styrene/Butadiene Rubber (Solprene 1204) | — | 100 |
| N-330 Carbon Black | 50 | 50 |

(figures quoted are parts by weight).

To separate portions of each of the masterbatches the products of Example 1 and Example 5 are added together with zinc diethyldithiocarbamate on a laboratory mill. Test pieces are vulcanised at 153° C for the times given in Table I. The properties of the vulcanisates are then measured. Full details of the amounts used and the test results obtained are given in Table I. A conventional curing system is included for comparison.

1,4-bis(methylsulphonyloxyurethane), a colourless viscous oil. On analysis the product was found to contain carbon 25.7%, hydrogen 4.2%, sulphur 18.3%; the theoretical figures being carbon 26.4%, hydrogen 4.4% and sulphur 17.6%.

EXAMPLE 11

Repitition of Example 5 using phenylene-1,4-bis-oxyethanol instead of 1,4-butane diol at the first stage afforded phenylene-1,4-bis(oxyethoxyphenylsulphonyloxyurethane), a pale yellow oil. On analysis the product was found to contain carbon 43.7%, hydrogen 4.3%, nitrogen 3.5%, sulphur 10.6%; the theoretical figures being carbon 43.4%, hydrogen 4.0%, nitrogen 4.7% and sulphur 10.7%.

EXAMPLE 12

Repitition of Example 3 using ethylene glycol instead of 1,4-butane diol afforded ethane 1,2-bis-(m-nitrophenylsulphonoxyurethane) a pale yellow glass. On analysis the product was found to contain carbon 35.6%, hydrogen 2.9%, nitrogen 7.9%, sulphur 11.6%; the theoretical figures being carbon 34.9%, hydrogen 2.55%, nitrogen 10.2% and sulphur 11.6%.

EXAMPLE 13

Repitition of Example 3 using diethylene glycol instead of 1,4-butane diol afforded ethoxyethyl-bis(m-nitrophenyl sulphonoxyurethane), a pale yellow viscous oil. On analysis the product was found to contain carbon 36.8%, hydrogen 5.5%, sulphur 11.0%; the theoretical figures being carbon 37%, hydrogen 3% and sulphur 10.8%.

EXAMPLE 14

464 parts of 2-hydroxyethylacrylate is added over 1 hour to a stirred mixture of 250 parts of calcium carbonate, 500 parts of phosgene and 500 parts of methylene dichloride at a temperature of 0° C under a reflux condenser cooled with solid carbon dioxide. The reaction Table I

|  | /1 | /2 | /3 | /4 | /5 | /6 |
|---|---|---|---|---|---|---|
| MB/1 | 150 | 150 | 150 | — | — | — |
| MB/2 | — | — | — | 150 | 150 | 150 |
| Zinc diethyldithiocarbamate | 4.0 | 4.0 | — | 4.0 | 4.0 | — |
| Product of Example 1 | 4.0 | — | — | 4.0 | — | — |
| Product of Example 2 | — | 4.0 | — | — | 4.0 | — |
| N-cyclohexylbenzthiazole sulphenamide | — | — | 0.5 | — | — | 1.2 |
| Sulphur | — | — | 2.5 | — | — | 1.8 |
| Zinc oxide[1] | — | — | 5.0 | — | — | 5.0 |
| Stearic acid | — | — | 3.0 | — | — | 1.0 |
| Rheometer at 153° C |  |  |  |  |  |  |
| Minimum viscosity (in.-lbs.) | 17 | 15.8 | 14.9 | 26 | 23.3 | 17.6 |
| Induction time $T_2$ (minutes) | 1.8 | 1.5 | 4.3 | 1.1 | 1.3 | 7.9 |
| State of cure at peak (in.-lbs) | 50 | 58 | 86 | 78 | 87 | 110 |
| Time to 95% peak cure (minutes) | 14 | 11 | 16 | 6 | 7 | 16 |
| Cure at 153° C (minutes) | 15 | 10 | 15 | 10 | 10 | 15 |
| Physical Properties |  |  |  |  |  |  |
| Tensile strength (kg/cm²) | 232 | 260 | 269 | 128 | 106 | 120 |
| Elongation at Break (%) | 490 | 480 | 395 | 350 | 240 | 190 |
| Modules at 200% (kg/cm²) | 52 | 74 | 150 | 60 | 88 | — |
| Resilience at R.T. (%) | 56 | 58 | 67 | 55 | 59 | 59 |
| Hardness (BS°) | 52 | 56 | 67 | 68 | 70 | 74 |
| Compression Set (%) after 24 hrs. at 70° C (25% Compression) | 34 | 30 | 36 | 28 | 15 | 24 |

EXAMPLE 10

Repitition of the final stage of Example 1 using 36.5 parts of butane-1,4-bis-N-hydroxycarbamate and 40.1 parts of methanesulphonylchloride instead of p-nitrobenzenesulphonylchloride gives 36 parts of butane-mixture is then stirred at 10° C for 6 hours and at 25° C for 18 hours after which the condenser is removed and a stream of dry nitrogen is passed to remove hydrogen chloride and excess phosgene. The reaction mixture is then filtered to remove calcium salts and methylene dichloride is distilled off under reduced pressure and 494 parts of 2-chlorocarbonyloxyethylacrylate are obtained. On analysis the compound was found to contain carbon 39.7%, hydrogen 4.2% and chlorine 18.3%; the theoretical figures being carbon 40.3%, hydrogen 3.9% and chlorine 19.8%.

A solution of 80 parts of sodium hydroxide in 120 parts of water and 178.5 parts of 2-chlorocarbonyloxyethylacrylate are added separately at equivalent rates over 1 hour to a stirred suspension of 69.5 parts of finely ground hydroxylamine hydrochloride in 600 parts of tertiary butanol at a temperature of 10° C. After a further 20 hours stirring at 25° C the reaction mixture is filtered to remove sodium chloride and the butanol layer is separated. Butanol is distilled off under reduced pressure and the residue is extracted into 500 parts of ethyl alcohol. The alcohol solution is filtered to remove sodium chloride and ethyl alcohol is distilled off under reduced pressure to give 148 parts of 2-(N-hydroxycarbamoyloxy)-ethylacrylate, a red oil. On analysis the compound was found to contain carbon 41.3%, hydrogen 6.3%, nitrogen 7.9%; the theoretical figures being carbon 41.1%, hydrogen 5.1% and nitrogen 8%.

A mixture of 87.5 parts of 2-(N-hydroxycarbamoyloxy)-ethylacrylate, 110.7 parts of m-nitrobenzenesulphonylchloride and 300 parts of dioxan are stirred together at a temperature of 0°–5° C while 50.5 parts of triethylamine is added over 2 hours at such a rate that the pH is maintained between 3 and 6. After a further 18 hours stirring at a temperature of 25° C the mixture is added to 2000 parts of water. The oily product is separated into 1000 parts of chloroform which is washed with water, dried and evaporated under reduced pressure at 40° C to give 178 parts of β-acryloyloxyethyl-N-(m-nitrophenylsulphonoxy)urethane, a brown oil. On analysis the product was found to contain carbon 37.3%, hydrogen 3.2%, nitrogen 5.9%, sulphur 10%; the theoretical figures being carbon 40.0%, hydrogen 3.3%, nitrogen 7.7% and sulphur 8.9%.

Solutions of 29.4 parts of butylacrylate in 50 parts of ethylene dichloride, 27 parts of β-acryloyloxyethyl-N-(m-nitrophenylsulphonyloxy)urethane in 50 parts of ethylene dichloride and 1 part of α,α'-diisobutyronitrile in 20 parts of toluene are added dropwise and concomitantly over 1½ hours to a preheated flask at 85° C containing 50 parts ethylene dichloride and covered with nitrogen. The reaction is stirred for 5 hours and solvent removed under reduced pressure to give 42 parts of a co-polymer of butyl acrylate and β-acryloyloxyethyl-N-(m-nitrophenylsulphonoxy)urethane in molecular ratio 3:1, a viscous brown oil. On analysis the compound was found to contain carbon 51.9%, hydrogen 6.4%, nitrogen 3.7%, sulphur 5.3%; the theoretical figures being carbon 53%, hydrogen 6.5%, nitrogen 3.9% and sulphur 4.3%.

EXAMPLES 15–19

The procedure of Example 2 was repeated using the products of Examples 10–14 in place of the product of Example 1 and the amount of zinc diethylcarbamate or tetramethylthiourea indicated in Table 2. The extension at break or peak torque with and without the additives is given in columns 5 to 8.

TABLE 2

| Example | Additive | Zinc diethyldithio-carbamate | TMTU | Extension at Break | Blank | Peak torque | Blank |
|---|---|---|---|---|---|---|---|
| 15 | 10 | 3 | — | — | — | 73 (190°/2 min) | 38 (190°/54 min) |
| 16 | 11 | — | 2 | 900% | 130% | | |
| 17 | 12 | 4 | — | 700% | 130% | 32.5 (153°/8 min) | 17 (153°/54 min.) |
| 18 | 13 | 3 | — | 900% | 130% | 43 (153°/8 min) | 17 (153°/54 min) |
| 19 | 14 | 4 | | | | 31 (160°/9 min) | no cure |

EXAMPLE 20

8.4 parts of butane-1,4-bis-(p-nitrophenylsulphonoxy)urethane is cooled to 0° C and ground with 5.3 parts of tetramethylthiourea. The mixture reacted exothermically to form a bright yellow oil which solidified on cooling to give 13.7 parts of bright yellow crystals.

EXAMPLE 21

6 parts of the product of Example 20 were milled into 100 parts of a 27:73 styrene-butadiene copolymer (SBR) at 55°–60° C to give a pale yellow sheet. The compounded rubber was cured at 190° C for 10 minutes to give a cross-linked rubber in which the extension at break was 700%. The styrene-butadiene copolymer cured without the additive has an extension at break of 130%.

We claim:

1. Poly-sulphonyloxyurethanes of the formula:

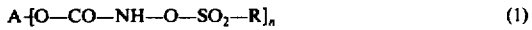

$$A\text{--}[O\text{--}CO\text{--}NH\text{--}O\text{--}SO_2\text{--}R]_n \qquad (1)$$

wherein A is a linking group to which the oxygen atoms are attached at alkyl, cycloalkyl or aryl carbon atoms, n is an integer of value at least 2, and each R which may be the same or different, is an optionally substituted alkyl or aryl group.

2. Poly-sulphonyloxyurethanes as claimed in claim 1 wherein A is an alkylene, alkarylene, bis-(alkyleneoxy)-phenylene, or polyoxyalkylene residue.

3. Poly-sulphonyloxyurethanes as claimed in claim 2 wherein A is $(CH_2)_m$ where $m = 2$ to 10, bis-(ethyleneoxy)phenylene or $-CH_2CH_2(OCH_2CH_2)_p$ where $p = 1$ or 2.

4. Poly-sulphonyloxyurethanes as claimed claim 1 wherein R is alkyl of 1–4 carbon atoms, phenyl, tolyl, nitro-, chloro-, bromo-, iodo-, fluoro- or alkoxy-phenyl.

5. Poly-sulphonyloxyurethanes as claimed in claim 4 wherein R is methyl, phenyl, tolyl or nitrophenyl.

6. Poly-sulphonyloxyurethanes as claimed in claim 1 wherein $n = 2$.

7. A process for manufacture of the poly-sulphonyloxyurethanes of claim 1 which comprises reacting a poly-(hydroxyurethane) of the formula:

$$A\text{--}[O\text{--}CO\text{--}NHOH]_n \qquad (3)$$

with n moles of a sulphonyl chloride of the formula:

$$R\text{--}SO_2Cl \qquad (4)$$

the symbols A, R and n having the meanings stated in claim 1, in the presence of an acid-binding agent which is added at a rate sufficient to neutralise the mineral acid formed whilst keeping the pH of the mixture below 7.

* * * * *